United States Patent [19]
Mukherjee et al.

[11] Patent Number: 6,111,641
[45] Date of Patent: Aug. 29, 2000

[54] NONLINEAR SPECTROPHOTOMETER

[75] Inventors: Anadi Mukherjee; Nandini Mukherjee; Conrad S. Sarvis, all of Albuquerque, N. Mex.; Bruce A. Reinhardt, Tipp City, Ohio

[73] Assignee: The United States of America as represented by the Secretary of the Air Force, Washington D, D.C.

[21] Appl. No.: 09/046,462

[22] Filed: Mar. 23, 1998

[51] Int. Cl.[7] .................................................. G01N 21/63
[52] U.S. Cl. .................. 356/317; 356/318; 250/458.1; 250/459.1; 250/461.1; 250/461.2
[58] Field of Search .................... 356/317, 318, 356/319; 250/458.1, 459.1, 461.1, 461.2

*Primary Examiner*—Robert H. Kim
*Assistant Examiner*—Andrew H. Lee
*Attorney, Agent, or Firm*—Bobby D. Scearce; Thomas L. Kundert; David E. Franklin

[57] ABSTRACT

The purpose of the nonlinear spectrophotometer is to provide a simple instrument that can be used on a routine basis to accurately measure the two-photon absorption (TPA) coefficient and cross-section on a wide variety of materials. The instrument is capable of measuring: (1) both organic and inorganic materials, (2) solutions and thin film materials forms, and (3) materials which are fluorescent and nonfluorescent.

4 Claims, 4 Drawing Sheets

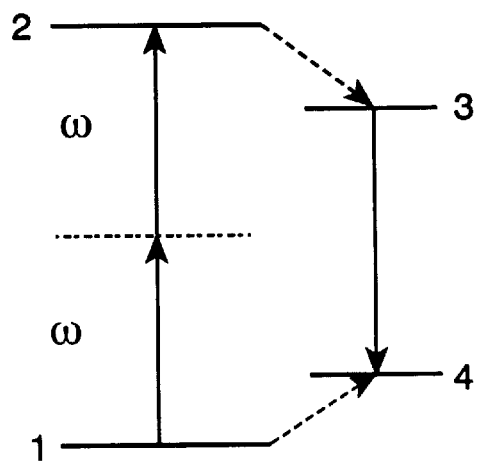
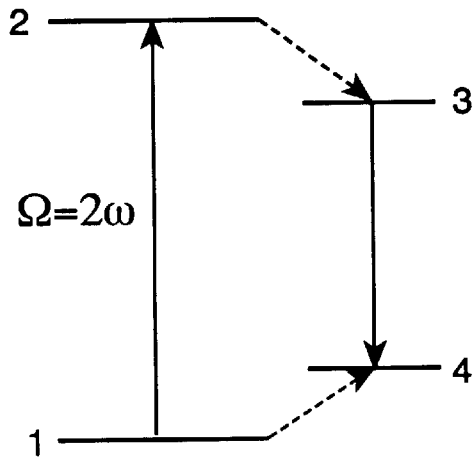
Fig. 3a    Fig. 3b
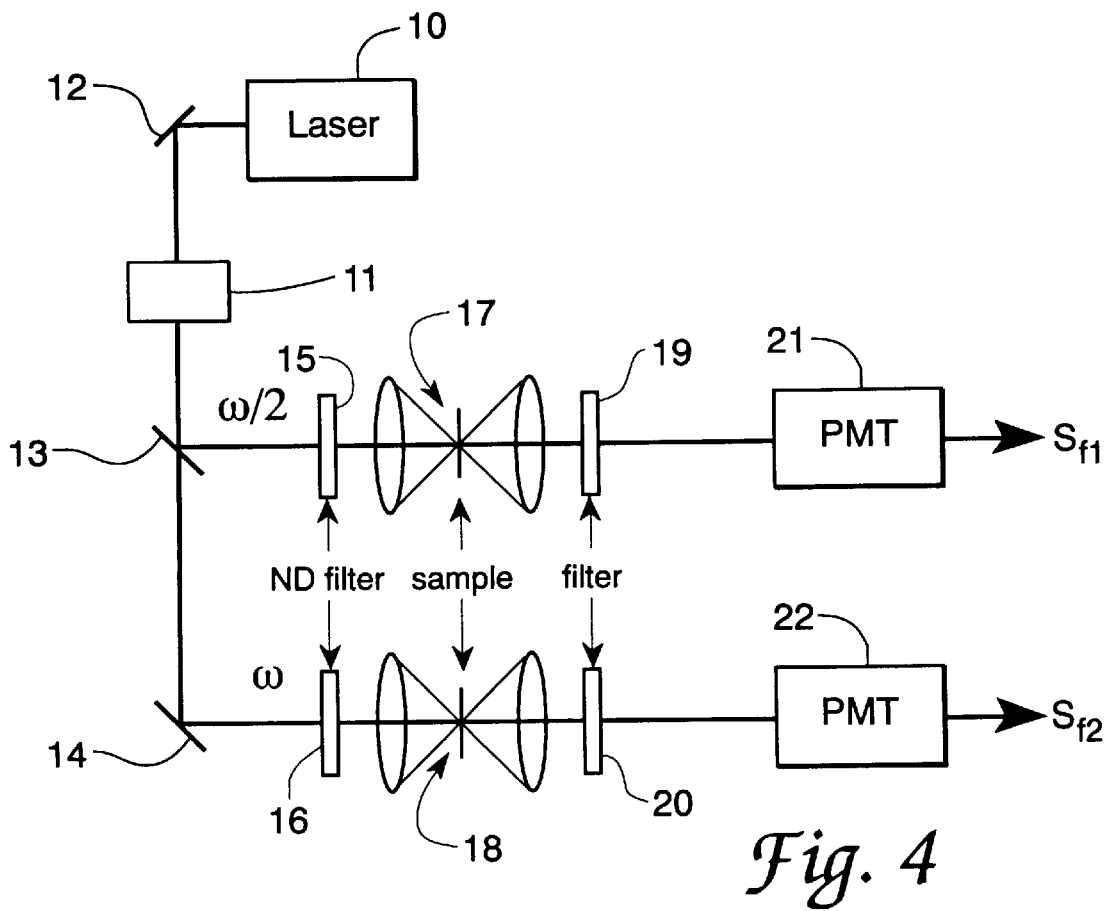
Fig. 4

NONLINEAR SPECTROPHOTOMETER

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention relates generally to the field of nonlinear optics. Specifically, it relates to the two-photon absorption measurement of materials.

2. Description of the Prior Art

In the past few years there have been many applications of two-photon absorption-fluorescence in the field of compact visible sources and microscopy. This rapidly developing field of research and development requires a large variety of materials of high two-photon absorption coefficient, fluorescence efficiency and environmental stability. The materials of particular importance are organic chromophore doped transparent polymeric materials and compound semiconductors.

Dependable measurement techniques exist for the real part of the third-order nonlinearity [such as Z-scan shown in FIG. 7 and THG etc.] in bulk materials. However, the dominant method for the measurement of two-photon absorption (TPA) coefficient (imaginary part of the third-order nonlinearity) in a material has been nonlinear transmission. In the bulk form, it is difficult and involved to experimentally consider nonlinear beam propagation effects, like self-focusing (defocusing) while measuring transmission at different intensities. To enable sufficient absorption for measurement, the concentrations of dye solutions are usually too high where aggregate formation masks the characterization of the monomeric species. In the thin film form, nonlinear waveguide transmission is used for the propagation of a high intensity beam over a long length of the medium. This technique is tedious in its sample preparation and coupling estimation besides the facet damage issues involved.

It is therefore a principal object of the invention to provide novel measurement of nonlinear optics absorption coefficients (second order and higher) of any semiconductor, organic and inorganic material in liquid or solid (bulk or thin film) form which is extremely sensitive and reliable due to being nearly background-free and without nonlinear beam propagation effects.

It is an additional object of the invention to provide a measurement system and method that requires no particular sample preparation, since the measurement can be done in liquid or solid (bulk or thin film) forms, in reflection or transmission mode.

It is another object of the invention to accommodate ultralow concentration (<1 mM/L) required in doped materials, allowing characterization of monomeric species and not of aggregates which exists in the more highly concentrated solutions needed in conventional methods.

It is yet another object of the invention to provide a system and method that can easily be automated, computer controlled and integrated into commercially available spectrophotometers.

It is a further object of the invention to utilize tunable diode lasers, standard optics and detectors allowing a system to be packaged in a space of 0.5 meter by 1 meter.

These and other objects of the invention will become apparent as the detailed description of representative embodiments proceeds.

SUMMARY OF THE INVENTION

The purpose of the present invention is to provide a simple instrument that can be used on a routine basis to accurately measure the two-photon absorption (TPA) coefficient and cross-section on a wide variety of materials. The instrument is capable of measuring: (1) both organic and inorganic materials, (2) solutions and thin film materials forms, and (3) materials which are fluorescent and nonfluorescent.

This invention describes the first nonlinear spectrophotometer. As of this time, nonlinear absorption coefficients and cross-sections are measured in specialized laboratories only, limiting the characterization of newly developing nonlinear optical (NLO) materials. The state of the art techniques such as nonlinear transmission and degenerate four-wave mixing (DFWM) are involved and time consuming. These techniques tend to be less reliable due to the presence of nonlinear beam propagation effects and interference from aggregates. The subject invention offers a solution to these problems in a new technique of characterizing NLO absorption in materials that is user friendly, quick, reliable, and cost effective in a compact portable device.

BRIEF DESCRIPTION OF THE DRAWINGS

The invention will be more clearly understood from the following detailed description of representative embodiments thereof read in conjunction with the accompanying drawings wherein:

FIG. 3 show the energy state comparison of fluorescence intensities from single and two-photon excitations.

FIG. 4 is the diagram for nonlinear spectrophometer for fluorescent materials.

DETAILED DESCRIPTION

Measurement of two-photon absorption cross sections according to the principal teaching of the invention is described in Mukherjee et al, "Measurement of two-photon absorption cross sections of dye moledules doped in thin films of polymethylmethacrylate", App Phys Lett 70 (Mar. 24, 1997) 1524–1526, the entire teachings of which are incorporated herein by reference.

The inventive system and method avoids the problems of existing methods described above, such as presented in the following: (1) Hermann et al., "Absolute measurement of two-photon cross-sections," Physical Review A, Vol. 5 (6) 2557 (1972); (2) Hermann et al., "Dispersion of the two-photon cross-section in Rhodamine dyes," Optics Communication, Vol. 6 (2) 101 (1972); and (3) Li et al., "Two-photon absorption cross-section measurements in common laser dyes at 1.06 microns," Optica Acta, Vol. 29 (3) 281 (1982). The teachings of these three journal articles, and of all patents, journal articles and other references cited herein, are incorporated herein by reference.

A spectrophotometer is an instrument for measuring the transmittance and reflectance of surfaces and media as a function of wavelength. The combined nonlinear spectrophotometer is an instrument that provides one or a combination of two apparatus embodiments for background-free measurement of two-photon nonlinear absorption cross section of any material. In addition, this measurement technique is free of the errors present in the current state-of-the-art. If the material fluoresces even weakly, the preferable apparatus is described in the first embodiment (i.e., measurement of two-photon nonlinear absorption cross section of materials that fluoresce.) If the materials do not fluoresce (like an indirect band gap semiconductor) the apparatus is discussed as the second embodiment (i.e., nonlinear Michelson interferometer—measurement of two-photon nonlinear absorption cross section of materials that do not fluoresce). Although the nonlinear Michelson interferometer (second embodiment) can also be used to measure two-photon nonlinear absorption cross section of materials that fluoresce, it is easier and convenient to use the first embodiment for these materials.

Figure 1:
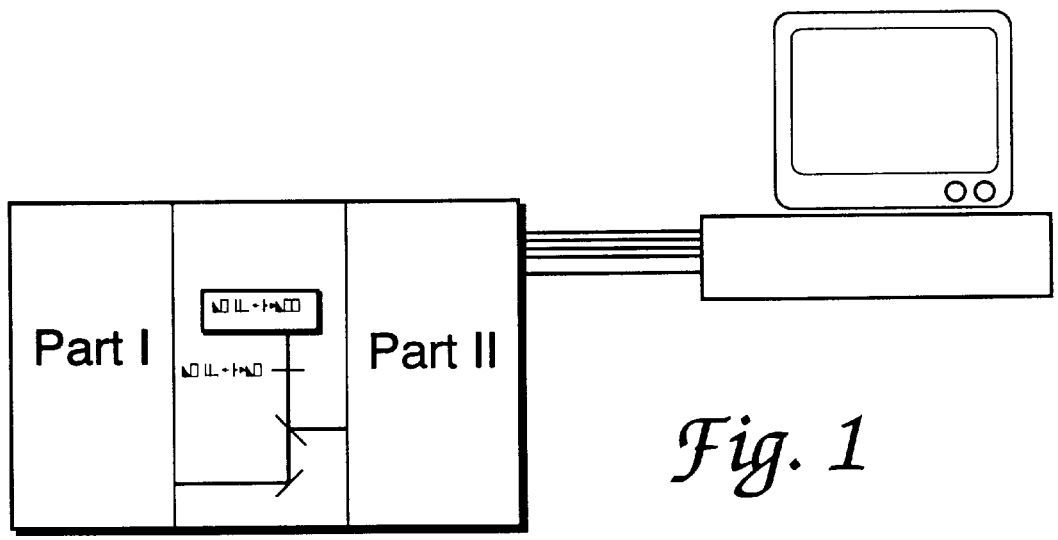
FIG. 1 is the layout of combined nonlinear spectrophotometer.

This combined nonlinear spectrophotometer is shown schematically in FIG. 1. It consists of a high intensity laser source (multi-stripe diode laser) as the pump beam of two compartments; one for the first embodiment (fluorescent materials) and the other for the second embodiment (nonfluorescent materials). The power of the laser beam is controlled by a variable attenuator, either manually or through a computer. Each compartment has its own appropriate optics, detectors and sample loading/unloading windows just like in a commercial spectrophotometer. A simple personal computer (PC) controlled data acquisition system is used to control attenuation of the pump beam and receive analog signals from the detectors. The combined nonlinear spectrophotometer includes user interface for providing parameters of the input samples. Then two-photon nonlinear absorption cross section will be measured in the appropriate compartment and result will be stored and displayed on the user interface. For dispersion measurements, different tunable diode lasers spanning the spectrum are used as the pump source. The pump beam is is shown in FIG. 1 as being divided into a first compartment beam and a second compartment beam by the combination of a main beam splitter and a main fully-reflective mirror. However, it is anticipated that various combinations of sources and optics could be used.

Figure 2:
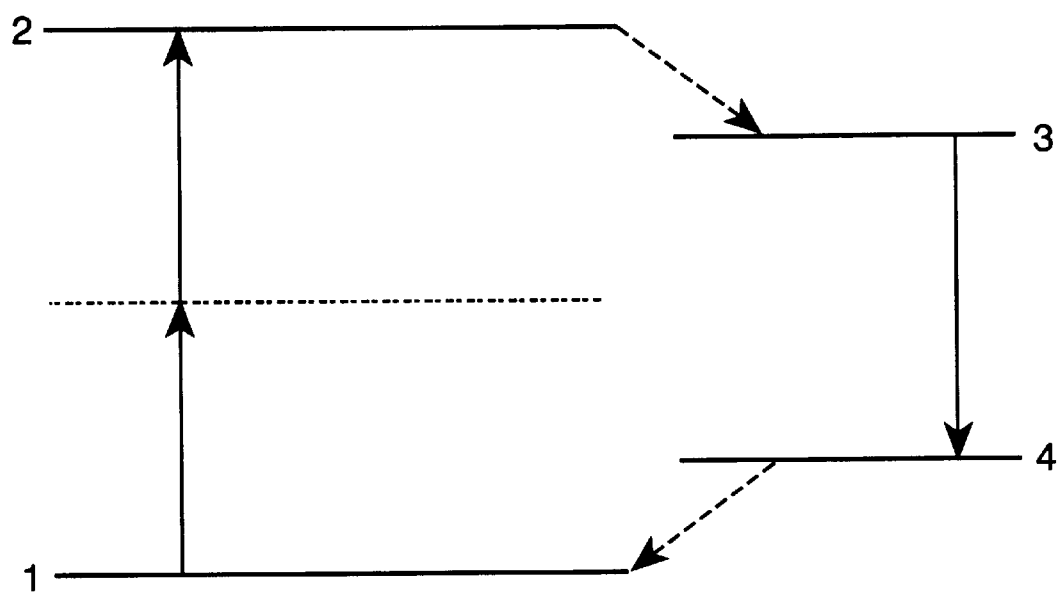
FIG. 2 illustrates the energy states for two-photon absorption (TPA) and fluorescence in a material.

The first embodiment, nonlinear spectrophotometer, is based on the energy diagram of TPA and fluorescence in a material as shown in FIG. 2. It is further based on the comparison of fluorescence intensities induced by single and two-photon excitations, as depicted in FIG. 3.

This nonlinear spectrophotometer measures the two-photon nonlinear absorption cross section of materials that fluoresce. The nonlinear spectrophotometer is drawn schematically as FIG. 4. From the ratio of the fluorescence it is possible to know two-photon nonlinear absorption cross section when the single-photon nonlinear absorption cross section and other pump laser parameters are known.

Referring to FIG. 4, a laser 10 emits a primary laser beam that may require directing by one or more fully-reflective mirrors 12 before passing through a second harmonic generation crystal 11. The primary laser beam is then split into a first signal manifold laser beam and a second signal manifold laser beam. In FIG. 4, this is depicted by a dichroic beamsplitter 13 performing the splitting. The first and second signal manifold laser beam may require redirecting, as suggested in FIG. 4 by a second fully-reflective mirror 14.

The first signal manifold laser beam passes through a first neutral density (ND) filter 15 to pass through a first harmonic laser spectra, which passes through a first sample 17, a first filter 19, and then to first photomultiplier tube 21. The second signal manifold laser beam passes through a second ND filter allowing the second harmonic laser spectra, which passes through a second sample 18, and a second filter 20, prior to being received by a second photomultiplier tube 22.

The material is optically pumped to the same group of levels (energetically) in the first manifold via single- or two-photon pumping. Once the molecules are excited to the same excited state they relax the same way in both pumping schemes. In other words, the fluorescing molecule does not remember how it has been excited and behaves the same way in both cases—single and two-photon pumping.

For two-photon excitation, pump absorption is negligible through 5 to 10 micron thick material and there is no appreciable propagation effects like self-focusing (or de-focusing) in contrast with the nonlinear propagation techniques used so far.

Two-photon nonlinear absorption cross section is known from a standard spectrophotometer measurements. Pulse energies are easily measured with power meters. Film thickness is measured by well-known techniques.

This technique eliminates all the problems of nonlinear propagation effects, sample preparation-waveguides, high concentration—aggregates and low signal to noise issues of the current techniques for the measurement of two-photon nonlinear absorption cross section.

As an example of the first embodiment, dye AF-50 was used in a test specimen (United States Air Force, Wright-Patterson Air Force Base, Wright Laboratories, Polymer Branch, Dayton, Ohio) having two-photon nonlinear absorption cross section peak at 782 nm. The two-photon wavelength (also the second harmonic generation wavelength) is 782/2=391 nm. Fluorescence is at 420 nm. This technique involves the comparison of single and two-photon excited fluorescence in chromophores. The physics of the measurement relies on excitation dynamics involving the same set of ground and excited levels. Under this condition, fluorescent signals becomes proportional to the absorption cross sections and thus allows the measurement of two-photon nonlinear absorption cross section knowing single-photon nonlinear absorption cross section, sample film thickness of the material and the parameters of the pump laser beam.

A 200 fs pulse train (100 MHz) from Titanium:Sapphire laser is frequency doubled and the fundamental and second harmonic beams are separated by a dichroic beam splitter. The two beams are focused separately onto two thin films (5–10 mm thick) of identically prepared dye-doped transparent polymer host (like polymethyl methacrylate) on a transparent substrate (like glass). The fluorescence signal from the films at a given spectral window are collected by lenses and detected by identical standard detectors (PMT e.g. GaAs(Cs) tube of Hamamatsu R636) after blocking the pump beams through appropriate filters. The ratio of the fluorescence signals is stored into the computer for each input pump power. The input pulse energies at one wave length and half a wave length are also measured. From the ratio of the fluorescence signals, pulse energies, intensities, sample film thickness, single photon absorption cross section of the material (from commercial spectrophotometer), the two-photon absorption cross section two-photon nonlinear absorption cross section is directly determined.

The power of this technique lies in its accuracy (absence of unaccountable physical factors) and simplicity of measurement and sample preparation. Some of the important points are listed below:

1. This fluorescence technique is a backgroundfree measurement compared with the high background measurement of nonlinear transmission. This background free measurement offers higher signal to noise ratio and a therefore a more reliable measurement of two-photon nonlinear absorption cross section.

2. Due to a very short propagation length (5–10 microns of material) there is no nonlinear propagation effects due to nonlinear refractive index, which is present and underestimated in the current state-of-the-art measurement techniques. Also excited state absorption is expected to be much smaller than in long propagation experiments.

3. Since TPA is weak, the concentration of dye required for sufficient change in nonlinear transmission is very high (typically >0.04 Mole/liter) [ref: A. Penzkofer and W. Leupacher, *Optical and Quantum Electronics* 19, 327–349, 1987]. At this high concentration, dyes dominantly form high percentage (typically 15–80% at 0.045 mole/li) of aggregates (dimers etc.) and the measured two-photon nonlinear absorption cross section is not of the monomers needed to evaluate the material accurately. This problem is solved in this technique where the required dye concentration can be even lower than 0.001 Mole/liter without much change in the signal to noise ratio. At this low concentration no formation of dimers or aggregates are expected. This measurement therefore yields the unambiguous value of two-photon nonlinear absorption cross section for the monomeric species only, of the chromophore.

The above factors comparing the proposed fluorescence technique with the currently used nonlinear propagation technique (either bulk liquids-solids or in waveguide form) points to the reliability of measuring two-photon nonlinear absorption cross section with high accuracy. All the physical parameters (pulse energy, duration, intensities, length of sample) needed in this technique are easily measured with high accuracy.

Two-photon nonlinear absorption cross section can be measured with high accuracy at any one wavelength within 20–40 nm bandwidth of single-photon absorption. Two-photon nonlinear absorption cross section at other wavelengths can be measured by scaling the two-photon induced fluorescence with its value at the wavelength where two-photon nonlinear absorption cross section was measured. This way the entire spectrum of two-photon nonlinear absorption cross section can be generated.

The best mode for practicing the first embodiment, nonlinear spectrophotometer, would be with diode laser implementation. Although two-photon fluorescence is very sensitive to intensity, lasers of picosecond and nanosecond pulses can also be used. The use of diode lasers allows inexpensive pricing, low power consumption and compact design, very much desired for the commercialization of this equipment.

In the case of long pulse excitation (ps and ns pulses) and/or long propagation lengths, excited state absorption is a substantial addition to the linear loss in the material and has to be included in the length integration for proper estimation of two-photon nonlinear absorption cross section. In this fluorescence technique, there is no propagation effect involved and very weak one step absorption is used. In addition, since we are taking the ratio of the fluorescence due to the two excitation schemes, the little contribution to the excited state absorption in both cases being very nearly same, cancels out (ratio).

The second embodiment is termed the Nonlinear Michelson Interferometer for the measurement of two-photon nonlinear absorption cross section of materials that do not fluoresce.

Figure 5:
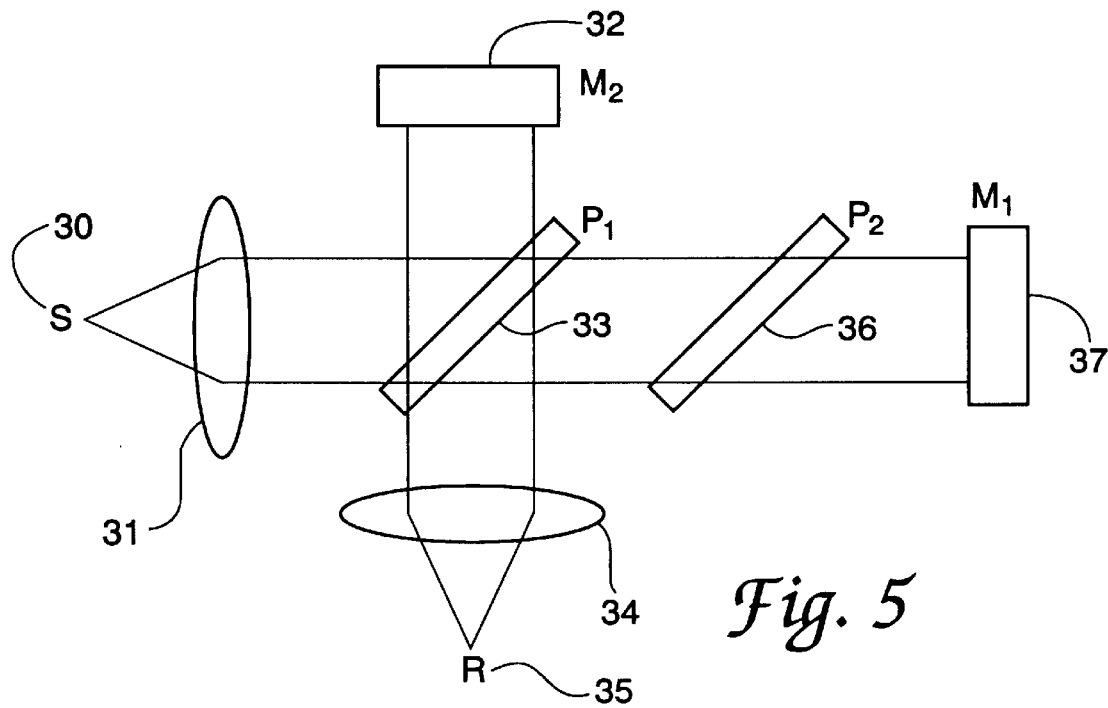
FIG. 5 is the diagram for a Michelson Interferometer (prior art).
Figure 6:
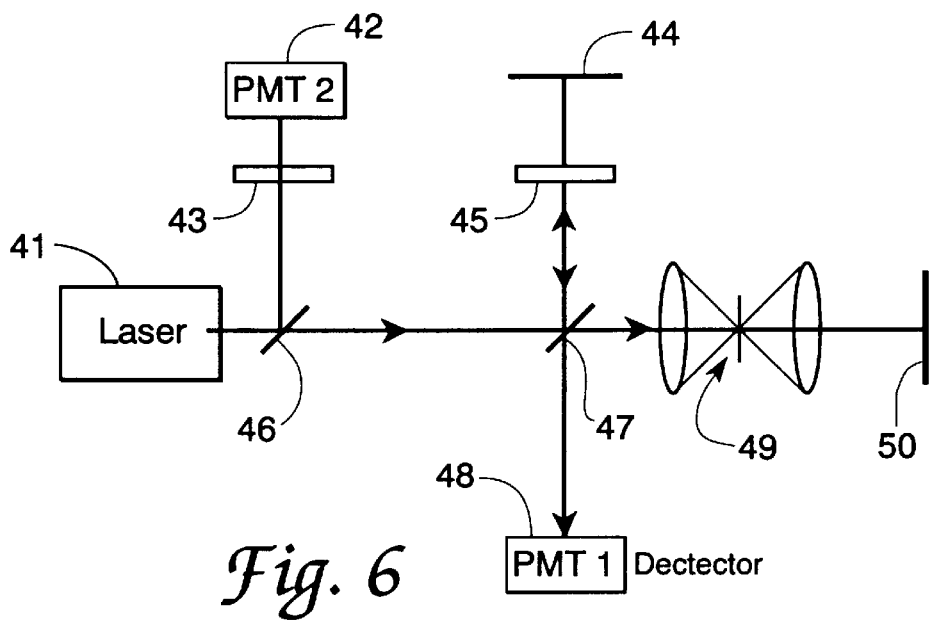
FIG. 6 is the diagram for the Nonlinear Michelson Interferometer.
Figure 7:
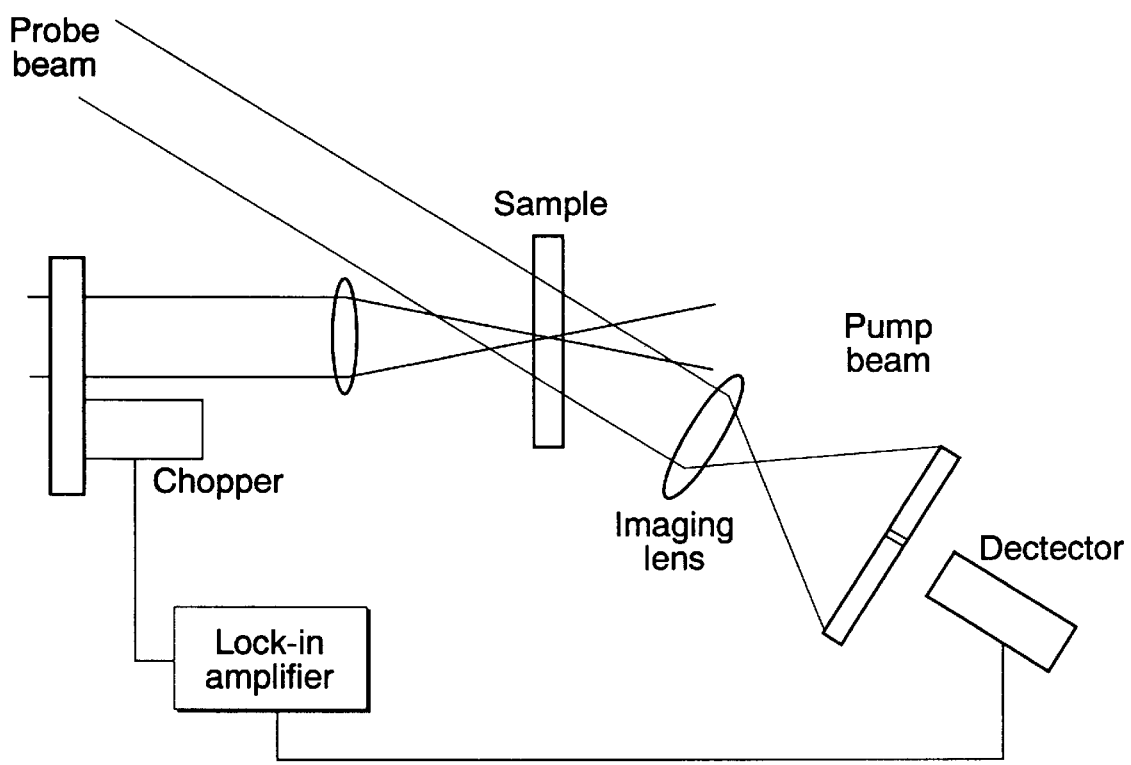
FIG. 7 is the diagram for performing the Z-scan technique.

This second embodiment involves an interferometric apparatus of measuring two-photon nonlinear absorption cross section shown in FIG. 6. This utilizes the well known Michelson interferometer shown in FIG. 5.

Referring to FIG. 5, the Michelson interferometer is based on division of amplitude. Light from an extended source S (30) is incident on a partially first reflecting plate (beam splitter) P1 (33). The light transmitted through P1 (33) reflects off first mirror M1 (37) back to plate P1 (33). The light that is reflected proceeds to second mirror M2 (32) which reflects it back to P1 (33). At P1 (33) the two waves are again partially reflected and partially transmitted, and a portion of each wave proceeds to the receiver R (34) which may be a screen, a photocell, or a human eye. Depending on the differences between the distances from the beam splitter to the mirrors M1 (37) and M2 (32), the two beams will interfere constructively or destructively. Second plate P2 (36) compensates for the thickness of P1 (33). Often when a quasi-monochromatic light source is used with the interferometer, compensating plate P2 (36) is omitted.

The Michelson interferometer can be used as a spectroscope. Consider first the case of two close spectrum lines as a light source for the instrument. As the mirror M1 (37) is shifted, fringes from each spectral line will cross the field. A certain path differences between M1 (37) and M2 (32) the fringes for the two spectral lines will be out of phase and will essentially disappear; at other points they will be in phase and will be reinforced. By measuring the distance between successive maxima in fringe contrast, it is possible to determine the wavelength difference between the lines.

In the second embodiment, the Michelson interferometer is modified on one arm to hold the sample (thin film on a transparent substrate) at the focus of a laser beam. See FIG. 6. The TPA through the sample makes this arm optically nonlinear. The other arm (linear) is unchanged other than an attenuator to balance the amplitude of the nonlinear arm at low intensity. The interferometer is aligned for destructive interference at the output at low intensity of the pump beam. A perfectly balanced interferometer should result in zero intensity at the output. Practically we may expect a very low signal which is the noise floor of our measurement. In absence of TPA the output stays zero.

When the intensity of the laser beam is increased, no change occurs at the linear arm, while due to TPA at the sample the amplitude in the nonlinear arm changes and the interferometer is no longer balanced at the destructive interference. This results practically a background-free signal at the output detected by a first photomultiplier tube (PMT 1) (48). As shown below, the output signal from this nonlinear Michelson interferometer is proportional to the square of the laser intensity. The proportionality constant, derived from the experimental data contains TPA coefficient b from which two-photon nonlinear absorption cross section is known.

The performance of the nonlinear Michelson interfermoter is shown, for example, in the situation of a perfect destructive interference in absence of TPA. This would create a condition of weak intensity, zero delay (pi phase in radians) between the two arms of the interferometer. Holding the relative phase between the two interfering beams at pi, the output is zero. With increasing intensity, the TPA sets in and the two amplitudes of the arms no longer cancel out.

This results in a nonzero output. Although the output signal is small, it is measured against zero background and thus easily detectable. The output signal will increase with the laser intensity and the rate of increase would be directly related to the two-photon nonlinear absorption cross section.

The invention therefore provides an accurate system for measuring two-photon absorption in fluorescent and non-fluorescent materials. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A nonlinear spectrophotometer for fluorescent materials comprising:
   (a) a laser for producing a primary laser beam;
   (b) a second harmonic generation crystal that alters the primary laser beam;
   (c) a beam splitter for dividing the primary laser beam into a first signal manifold laser beam and a second signal manifold laser beam;
   (d) a first neutral density filter for filtering the first signal manifold laser beam to a first harmonic spectrum;
   (e) a means for passing filtered first signal manifold laser beam through a sample;
   (f) a first sensor for detecting filtered first signal manifold laser beam after passing through a sample;
   (g) a second neutral density filter for filtering the second signal manifold laser beam to a second harmonic spectrum;
   (h) a means for passing filtered second signal manifold laser beam through a sample;
   (i) a second sensor for detecting filtered second signal manifold laser beam after passing through a sample; and
   (j) a means to compare the outputs of the first and second sensors.

2. The nonlinear spectrophotometer of claim 1 in which the laser is a multi-stripe titanium-sapphire diode laser.

3. The nonlinear spectrophotometer of claim 1 in which the first and second sensors comprise a photomultiplier tube.

4. The nonlinear spectrophotometer of claim 1 in which the beam splitter is a dichroic beam splitter.

* * * * *